(12) United States Patent
Zaldivar Ortiz et al.

(10) Patent No.: US 10,106,117 B2
(45) Date of Patent: Oct. 23, 2018

(54) ROOF HEADLINER WITH SILICONE ENERGY ABSORPTION PANEL

(71) Applicant: GM GLOBAL TECHNOLOGY OPERATIONS LLC, Detroit, MI (US)

(72) Inventors: Laura Nathaly Zaldivar Ortiz, Metepec (MX); Adriana Morales Estevez, Toluca (MX); Francisco Plata, Sterling Heights, MI (US); Fernando Zamora Romero, Otzolotepec (MX)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 15/244,013

(22) Filed: Aug. 23, 2016

(65) Prior Publication Data

US 2018/0056912 A1 Mar. 1, 2018

(51) Int. Cl.
*B60R 13/02* (2006.01)
*B60R 21/04* (2006.01)
*B62D 25/06* (2006.01)

(52) U.S. Cl.
CPC .......... *B60R 21/04* (2013.01); *B60R 13/0212* (2013.01); *B62D 25/06* (2013.01); *B60R 2021/0442* (2013.01)

(58) Field of Classification Search
CPC .............. B60R 21/04; B60R 21/0428; B60R 2021/0414; B60R 2021/0435; B60R 2021/0442; B60R 13/025; B60R 13/0206; B62D 21/15; B62D 21/152; B62D 21/157; B62D 25/02; B62D 25/087; B62D 25/04; B62D 25/14; B62D 25/025

USPC ..... 296/187.05, 146.7, 39.1, 187.12, 203.02, 296/24.4, 275, 1.08, 214; 280/751, 748, 280/730.2, 728.3, 750, 752, 753; 188/377, 372

See application file for complete search history.

(56) References Cited

U.S. PATENT DOCUMENTS

| | | | | |
|---|---|---|---|---|
| 5,082,716 A * | 1/1992 | Satterfield | ............... | B29C 70/46 296/214 |
| 9,120,436 B2 * | 9/2015 | Geissenhoener | ... | B60R 13/0212 |
| 2002/0190506 A1 * | 12/2002 | Tiesler | .................... | B60R 11/00 280/730.1 |
| 2005/0258668 A1 * | 11/2005 | Brown | ................ | B60R 13/0225 296/214 |
| 2013/0320708 A1 * | 12/2013 | Klausmann | ............. | B60R 21/04 296/187.05 |
| 2015/0274092 A1 * | 10/2015 | Yang | ..................... | B29C 51/428 156/196 |
| 2015/0307036 A1 * | 10/2015 | Day | .................... | B60R 13/0815 296/39.3 |

\* cited by examiner

*Primary Examiner* — D Glenn Dayoan
*Assistant Examiner* — Sunsurraye Westbrook
(74) *Attorney, Agent, or Firm* — Quinn IP Law

(57) ABSTRACT

A roof headliner for a vehicle includes a substrate defining a surface. The substrate is configured for attachment to an interior surface of a roof of a passenger compartment of the vehicle. The roof headliner includes an energy absorption panel that is attached to the surface of the substrate. The energy absorption panel includes a silicone based material. The energy absorption panel extends an entire length along an edge of an upper roof zone of the vehicle, and is positioned to extend both inboard and outboard of the edge of the upper roof zone.

16 Claims, 3 Drawing Sheets

ROOF HEADLINER WITH SILICONE ENERGY ABSORPTION PANEL

TECHNICAL FIELD

The disclosure generally relates to a roof headliner for a vehicle.

BACKGROUND

Vehicles include a structure that surrounds a passenger compartment. The structure may include a body having a roof that covers the passenger compartment. Typically, the vehicle includes a headliner that is attached to the roof and positioned adjacent an interior surface of the roof. The headliner may include one or more energy absorption devices for absorbing energy from an applied force.

SUMMARY

A roof headliner for a vehicle is provided. The roof headliner includes a substrate defining a surface. The substrate is configured for attachment to an interior surface of a roof of a passenger compartment of the vehicle. The roof headliner further includes an energy absorption panel that is attached to the surface of the substrate. The energy absorption panel includes a silicone based material.

A vehicle is also provided. The vehicle includes a body defining a passenger compartment. The body includes a roof having an interior surface facing the passenger compartment. A substrate is attached to the roof. The substrate includes an upper surface disposed adjacent the interior surface of the roof, and a lower surface disposed opposite the upper surface and facing the passenger compartment. The substrate is formed to define an upper roof zone having an edge extending a zone length. A cloth liner is attached to the substrate, and disposed against the lower surface of the substrate. An energy absorption panel is attached to one of the upper surface or the lower surface of the substrate. The energy absorption panel is a silicone based material and includes a panel thickness measured substantially perpendicular to the one of the upper surface or the lower surface of the substrate to which the energy absorption panel is attached. The panel thickness is between 3.0 mm and 15 mm.

The energy absorption panel may include a panel length that extends generally parallel with the edge of the upper roof zone. The panel length of the energy absorption panel may be equal to or greater than the zone length of the edge of the upper roof zone.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
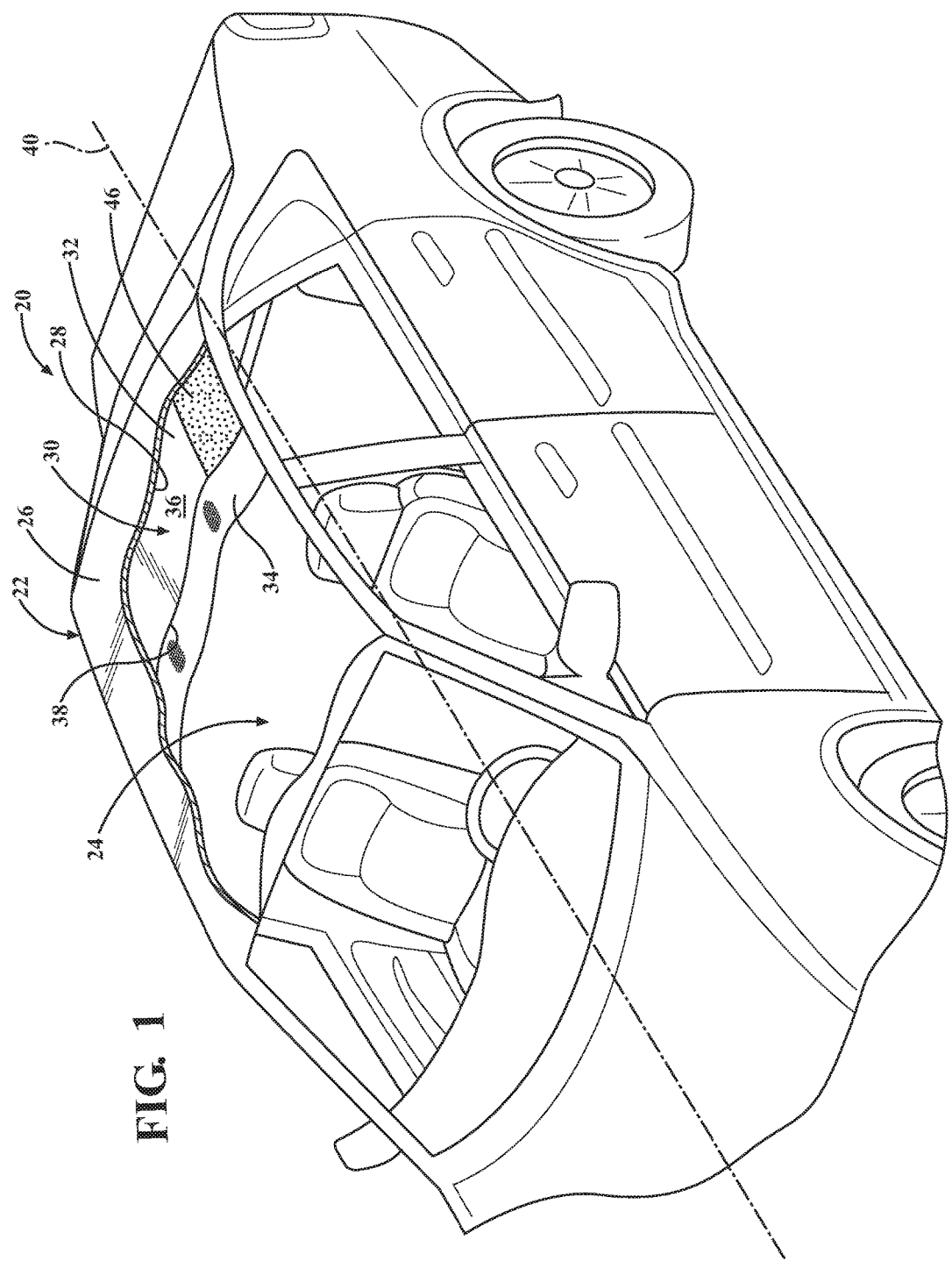
FIG. 1 is a schematic perspective view of a vehicle.

Referring to the Figures, wherein like numerals indicate like parts throughout the several views, a vehicle is generally shown at 20. Referring to FIG. 1, the vehicle 20 may include any style and/or configuration of a moveable platform having a body 22 that defines a passenger compartment 24, and includes a roof 26 having an interior surface 28 facing the passenger compartment 24. For example, the vehicle 20 may include, but is not limited to, a car, a truck, an SUV, a semi-truck, a tractor, a boat, a train, etc.

The vehicle 20 includes a roof headliner 30 disposed within the passenger compartment 24 for concealing the interior surface 28 of the roof 26 and/or system components attached to the roof 26. The roof headliner 30 includes a substrate 32 and a cloth liner 34. The substrate 32 defines a surface. More specifically, the substrate 32 defines an upper surface 36 and a lower surface 38. The upper surface 36 is disposed opposite the lower surface 38. The upper surface 36 faces the interior surface 28 of the roof 26, whereas the lower surface 38 of the substrate 32 faces the passenger compartment 24.

The substrate 32 is formed to fit against, and is attached to the roof 26, adjacent the interior surface 28 of the roof 26. The substrate 32 may be attached to the roof 26 in any suitable manner, including but not limited to one or more fasteners, clips, etc. Alternatively, the substrate 32 may be bonded to the roof 26 with an adhesive. The specific manner in which the substrate 32 is attached to the roof 26 is not pertinent to the teachings of this disclosure, and is therefore not described in detail herein.

Figure 2:
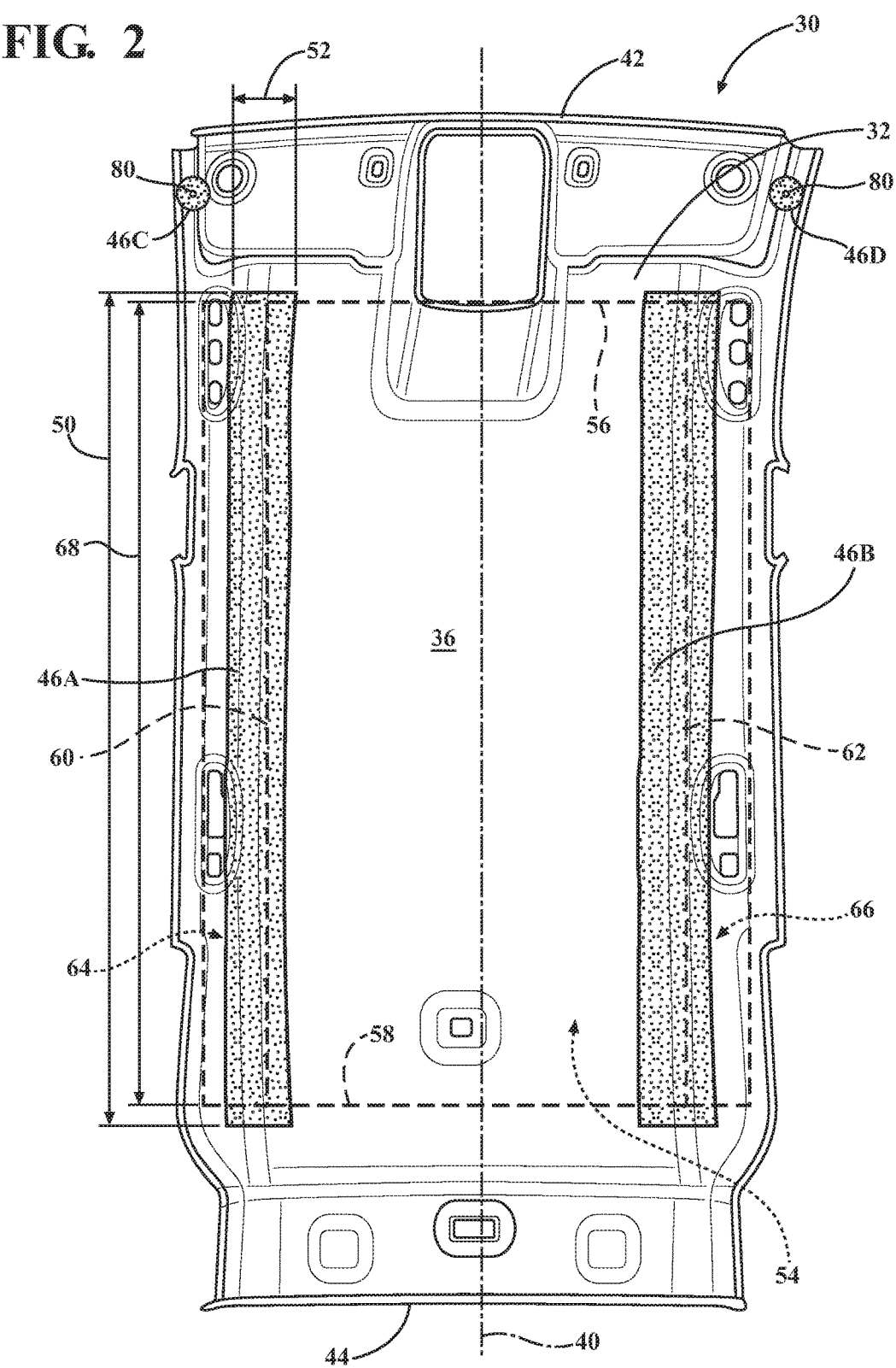
FIG. 2 is a schematic plan view of an upper surface of a headliner for the vehicle.

Referring to FIG. 2, the substrate 32 extends along a longitudinal axis 40, between a forward end 42 of the substrate 32 and a rearward end 44 of the substrate 32. As used herein, the term "longitudinal" refers to the central, long axis of the vehicle 20 that extends between a forward end 42 and a rearward end 44 of the vehicle 20, and generally passes through a center of mass of the vehicle 20.

Figure 3:
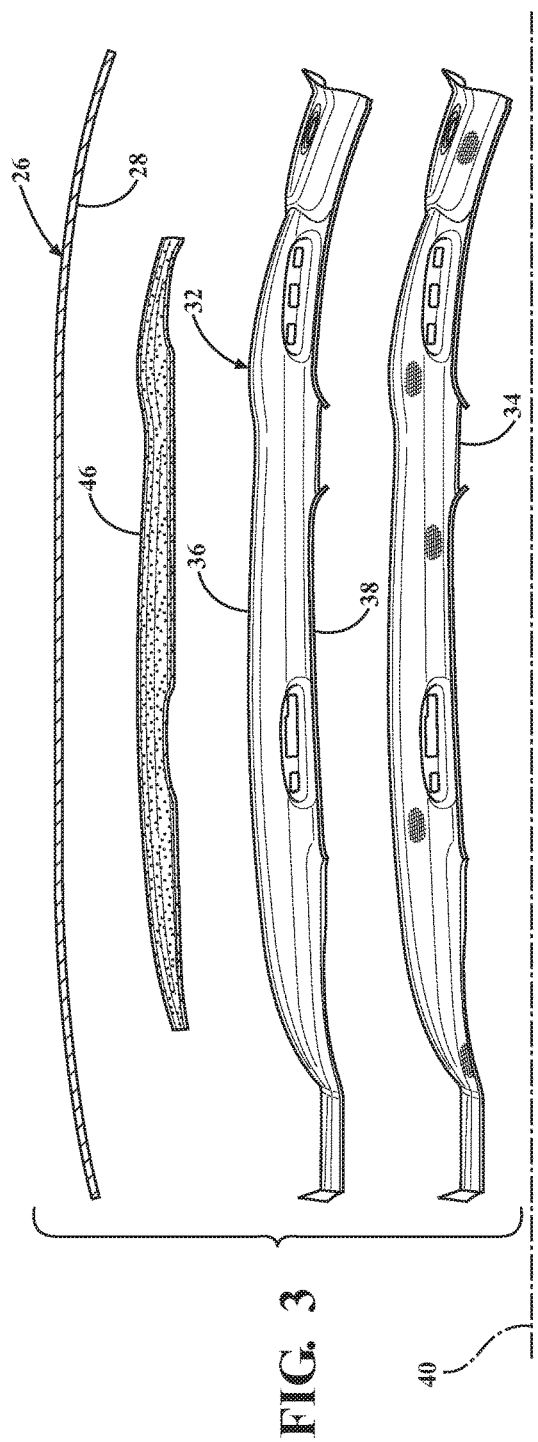
FIG. 3 is a schematic, exploded side view of the headliner.
Figure 4:
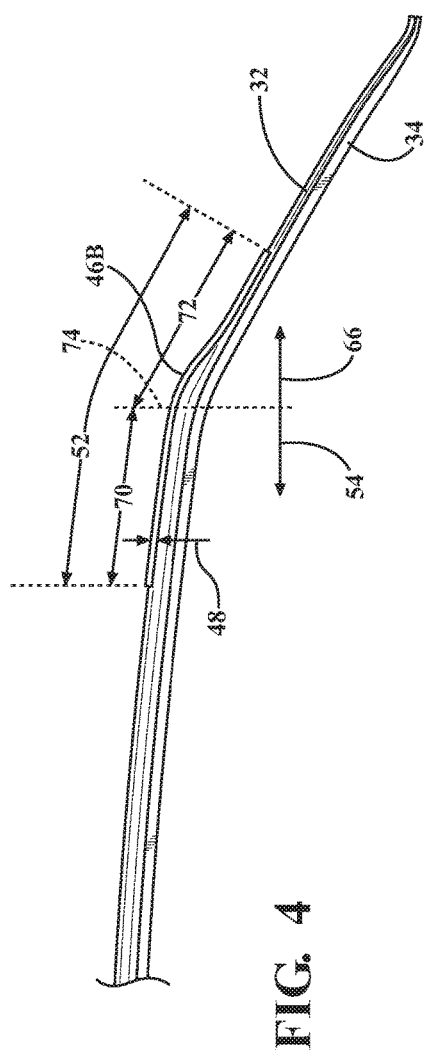
FIG. 4 is a schematic, partial cross sectional view of the headliner.

Referring to FIGS. 1, 3, and 4, the cloth liner 34 is disposed adjacent and attached to the lower surface 38 of the substrate 32. The cloth liner 34 may be attached to the substrate 32 in any suitable manner. For example, the cloth liner 34 may be bonded to the substrate 32 with an adhesive. The specific manner in which the cloth liner 34 is attached to the substrate 32 is not pertinent to the teachings of this disclosure, and is therefore not described in detail herein. The cloth liner 34 provides the finished surface that is exposed to occupants within the passenger compartment 24 of the vehicle 20.

Referring to FIG. 2, the roof headliner 30 further includes at least one energy absorption panel 46. The roof headliner 30 may include multiple energy absorption panels 46A, 46B, 46C, 46D disposed at different locations on the substrate 32. In the exemplary embodiment shown in the Figures, the vehicle 20 includes a first energy absorption panel 46A, a second energy absorption panel 46B, a third energy absorption panel 46C, and a fourth energy absorption panel 46D. The written specification may refer to the first energy absorption panel 46A the second energy absorption panel 46B, the third energy absorption pane 46C, and/or the fourth energy absorption panel 46D specifically, or may refer to them generally as a singular energy absorption panel 46. The energy absorption panel 46 is attached to either the upper surface 36 or the lower surface 38 of the substrate 32. The exemplary embodiment shown in the Figures shows the energy absorption panel 46 disposed adjacent and attached to the upper surface 36 of the substrate 32. However, it should be appreciated that the energy absorption panel 46 may alternatively be disposed adjacent and attached to the lower surface 38 of the substrate 32.

The energy absorption panel 46 is a silicone based material. As used herein, a "silicone based material" should be interpreted to include pure silicone, or any silicone compound or mixture in which silicone provides the largest percentage of the constituent components of the mixture. The specific silicone based material is selected to provide a high level of energy absorption for absorbing and dissipating energy from a force that is applied to the roof headliner 30 from within the passenger compartment 24.

Referring to FIG. 4, the energy absorption panel 46 includes a panel thickness 48 that is measured substantially perpendicular to the surface of the substrate 32 to which the energy absorption panel 46 is attached. More specifically, the panel thickness 48 is measured from the one of the upper surface 36 or the lower surface 38 of the substrate 32 to which the energy absorption panel 46 is attached. Preferably, the panel thickness 48 is between 3.0 mm and 15 mm. However, it should be appreciated that the panel thickness 48 may vary from the exemplary range provided herein.

Referring to FIG. 2, the energy absorption panel 46 may include a panel length 50, and a panel width 52, such as the first energy absorption panel 46A and the second energy absorption panel 46B. Accordingly, the three dimensions of the energy absorption panel 46 may be defined by the panel thickness 48 (shown in FIG. 4), the panel length 50, and the panel width 52. The panel length 50 extends generally parallel with the longitudinal axis 40 of the vehicle 20. The panel width 52 extends generally transverse relative to the longitudinal axis 40, in a generally perpendicular direction relative to the longitudinal axis 40. Alternatively, the energy absorption panel 46 may include a non-rectangular shape, such as but not limited to a circular or oval shape, such as shown by the third energy absorption panel 46C and the fourth energy absorption panel 46D. The third energy absorption panel 46C and the fourth energy absorption panel 46D are shown having a circular shape. Accordingly, the dimension of the third energy absorption panel 46C and the fourth energy absorption panel 46D may be described by the panel thickness 48, such as shown in FIG. 4, and a diameter of the third energy absorption panel 46C and the fourth energy absorption panel 46D. Accordingly, it should be appreciated that the energy absorption panel 46 may be applied to a point or small area location, such as shown by the third energy absorption panel 46C and the fourth energy absorption panel 46D, or may be applied to elongated or large area locations, such as shown by the first energy absorption panel 46A and the second energy absorption panel 46B.

Referring to FIG. 2, the substrate 32 is formed to define an upper roof zone 54. The upper roof zone 54 includes a forward edge 56, a rearward edge 58, a first lateral edge 60, and a second lateral edge 62. The forward edge 56 and the rearward edge 58 of the upper roof zone 54 extend generally transverse across a width of the vehicle 20. The first lateral edge 60 and the second lateral edge 62 of the upper roof zone 54 generally extend along or parallel with the longitudinal axis 40 of the vehicle 20. The substrate 32 is further formed to define a first side rail zone 64, and a second side rail zone 66. The first side rail zone 64 and the second side rail zone 66 generally extend along and are parallel with the longitudinal axis 40 of the vehicle 20. The first side rail zone 64 is disposed adjacent the first lateral edge 60 of the upper roof zone 54, and the second side rail zone 66 is disposed adjacent the second lateral edge 62 of the upper roof zone 54. It should be appreciated that the substrate 32 may be formed to define other roof zones and/or point locations as understood by those skilled in the art, such as but not limited to an A-pillar reference point, generally indicated by 80. The location of the upper roof zone, and the side rail zones are understood by those skilled in the art, and are therefore not described in detail herein. Additionally, the location of the A-pillar reference point is understood by those skilled in the art, and is therefore not described in detail herein.

Referring to FIG. 2, the upper roof zone 54 includes an edge that extends a zone length 68. As shown in the exemplary embodiment of the Figures, the edge is defined as either the first lateral edge 60 or the second lateral edge 62, and the zone length 68 extends along and generally parallel with the longitudinal axis 40 of the vehicle 20. However, in other embodiments, the edge of the upper roof zone 54 may be defined as the forward edge 56 or the rearward edge 58, with the zone length 68 extending generally transverse to the longitudinal axis 40 of the vehicle 20.

One of the panel length 50 or the panel width 52 of the energy absorption panel 46 is longer than the edge of the upper roof zone 54 used to define the zone length 68. For example, in the exemplary embodiment shown in the Figures, the energy absorption panel 46 includes the first energy absorption panel 46A that is positioned to extend along the first lateral edge 60, and the second energy absorption panel 46B that is positioned to extend along the second lateral edge 62. Accordingly, the panel length 50 of the first energy absorption panel 46A and the second energy absorption panel 46B is longer than the panel width 52 of the first energy absorption panel 46A and the second energy absorption panel 46B respectively. In the exemplary embodiment shown in the Figures, the panel length 50 of the energy absorption panels 46A, 46B is equal to or greater than the zone length 68 of the lateral edges 60, 62 of the upper roof zone 54. However, if the energy absorption panel 46 is positioned adjacent either the forward edge 56 or the rearward edge 58 of the upper roof zone 54, such that the panel width 52 would be greater than the panel length 50, than the panel width 52 of the energy absorption panel 46 would be greater than the zone length 68 as defined by either the forward edge 56 or rearward edge 58 of the upper roof zone 54.

Referring to FIG. 4, in the exemplary embodiment shown in the Figures, the panel width 52 of the energy absorption panel 46 includes an inboard width 70 portion and an outboard width 72 portion. The inboard width 70 portion extends over the upper roof zone 54, whereas the outboard width 72 portion extends over one of the side rail zones. The upper roof zone and the second side rail zone are shown in FIG. 4, separated by dividing line 74. The inboard width 70 portion is measured in an inboard direction 71, from the lateral edge of the upper roof zone 54 to an inboard most edge of the energy absorption panel 46. The outboard width 72 portion is measured in an outboard direction 73, from the lateral edge of the upper roof zone 54 to an outboard most edge of the energy absorption panel 46. As used herein, the term "inboard direction" refers to a direction extending toward the longitudinal axis 40 of the vehicle 20, and the term "outboard direction" refers to a direction extending away from the longitudinal axis 40 of the vehicle 20.

Preferably, the inboard width 70 portion is between 50 mm and 100 mm. More preferably, the inboard width 70 portion is between 70 mm and 80 mm. However, it should be appreciated that the inboard width 70 portion may vary from the exemplary ranges provided herein, and may be greater than 100 mm, or less than 50 mm. Preferably, the outboard width 72 portion is between 25 mm and 75 mm. More preferably, the outboard width 72 portion is between 45 mm and 55 mm. However, it should be appreciated that the outboard width 72 portion may vary from the exemplary ranges provided herein, and may be greater than 75 mm, or less than 25 mm.

Referring to FIG. 4, the third energy absorption panel 46C and the fourth energy absorption panel 46D are shown having a circular shape defining a diameter. The diameter of each of the third energy absorption panel 46C and the fourth energy absorption panel 46D may be in the range of between 20 to 50 mm. However, it should be appreciated that the diameter of the third energy absorption panel 46C and the fourth energy absorption panel 46D may vary from the exemplary range provided herein. Additionally, the panel thickness 48 of the third energy absorption panel 46C and the fourth energy absorption panel 46D may be similar or identical to the panel thickness of the first energy absorption panel 46A and the second energy absorption panel 46C. Specifically, the panel thickness 48 of the third energy absorption panel 46C and the fourth energy absorption panel 46D may be between the range of between 3.0 mm and 15 mm. However, it should be appreciated that the panel thickness 48 may vary from the exemplary range provided herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A roof headliner for a vehicle, the roof headliner comprising:
    a substrate defining a surface, wherein the substrate is configured for attachment to an interior surface of a roof of a passenger compartment of the vehicle;
    an energy absorption panel attached to the surface of the substrate, wherein the energy absorption panel includes silicone;
    wherein the substrate extends along a longitudinal axis, between a forward end of the substrate and a rearward end of the substrate;
    wherein the substrate is formed to define an upper roof zone having a lateral edge extending substantially parallel with the longitudinal axis of the substrate;
    wherein the energy absorption panel includes a panel width including an inboard width portion measured in an inboard direction from the lateral edge of the upper roof zone, and an outboard width portion measured in an outboard direction from the lateral edge of the upper roof zone; and
    wherein the inboard width portion is between 50 mm and 100 mm.

2. The roof headliner set forth in claim 1, wherein the energy absorption panel includes a panel thickness measured substantially perpendicular to the surface of the substrate that is between 3.0 mm and 15 mm.

3. The roof headliner set forth in claim 1, wherein the surface of the substrate includes one of an upper surface of the substrate or a lower surface of the substrate, wherein the lower surface of the substrate is disposed opposite the upper surface of the substrate.

4. The roof headliner set forth in claim 3, further comprising a cloth liner attached to the lower surface of the substrate.

5. The roof headliner set forth in claim 4 wherein the energy absorption panel is attached to the upper surface of the substrate.

6. The roof headliner set forth in claim 1, wherein the energy absorption panel includes a panel length extending generally parallel with the longitudinal axis of the substrate, and a panel width extending generally transverse to the longitudinal axis of the substrate.

7. The roof headliner set forth in claim 6, wherein the panel length of the energy absorption panel is longer than the panel width of the energy absorption panel.

8. The roof headliner set forth in claim 1, wherein the lateral edge of the upper roof zone extends a zone length along and generally parallel with the longitudinal axis of the substrate.

9. The roof headliner set forth in claim 8, wherein the energy absorption panel includes a panel length extending generally parallel with the longitudinal axis of the substrate, and wherein the panel length of the energy absorption panel is equal to or greater than the zone length of the lateral edge of the upper roof zone.

10. The roof headliner set forth in claim 1, wherein the outboard width portion is between 25 mm and 75 mm.

11. The roof headliner set forth in claim 1, wherein the energy absorption panel includes a circular shape having a diameter between 20 mm and 50 mm.

12. The roof headliner set forth in claim 11, wherein the energy absorption panel is centered over an A-pillar reference point.

13. A vehicle comprising:
    a body defining a passenger compartment and including a roof having an interior surface facing the passenger compartment;
    a substrate attached to the roof, and including an upper surface disposed adjacent the interior surface of the roof, and a lower surface disposed opposite the upper surface and facing the passenger compartment;
    wherein the substrate is formed to define an upper roof zone having an edge extending a zone length;
    a cloth liner attached to the substrate, and disposed against the lower surface of the substrate; and
    an energy absorption panel attached to one of the upper surface or the lower surface of the substrate, wherein the energy absorption panel is a silicone based material and includes:
        a panel thickness measured substantially perpendicular to the one of the upper surface or the lower surface of the substrate to which the energy absorption panel is attached, wherein the panel thickness is between 3.0 mm and 15 mm; and
        a panel length extending generally parallel with the edge of the upper roof zone, wherein the panel length of the energy absorption panel is equal to or greater than the zone length of the edge of the upper roof zone.

14. The vehicle set forth in claim 13, wherein the edge of the upper roof zone is a lateral edge of the upper roof zone that extends substantially parallel with a longitudinal axis of the substrate, and the panel length extends substantially parallel with the longitudinal axis of the substrate.

15. The vehicle set forth in claim 14, wherein the energy absorption panel includes a panel width including an inboard width portion measured in an inboard direction from the lateral edge of the upper roof zone, and an outboard width portion measured in an outboard direction from the lateral edge of the upper roof zone.

16. The vehicle set forth in claim 15, wherein the inboard width portion is between 50 mm and 100 mm, and the outboard width portion is between 25 mm and 75 mm.

\* \* \* \* \*